US006622023B2

United States Patent
Chheda (10) Patent No.: US 6,622,023 B2
(45) Date of Patent: Sep. 16, 2003

(54) METHOD AND APPARATUS FOR IMPROVED FAST FORWARD POWER CONTROL IN A CDMA NETWORK

(75) Inventor: Ashvin H. Chheda, Plano, TX (US)

(73) Assignee: Nortel Networks Limited, St. Laurent (CA)

( * ) Notice: Subject to any disclaimer, the term of this patent is extended or adjusted under 35 U.S.C. 154(b) by 453 days.

(21) Appl. No.: 09/732,268

(22) Filed: Dec. 7, 2000

(65) Prior Publication Data

US 2002/0072384 A1 Jun. 13, 2002

(51) Int. Cl.[7] ................................................. H04B 7/00
(52) U.S. Cl. ........................ 455/522; 455/69; 455/442; 375/141
(58) Field of Search ...................... 455/69, 522, 442; 370/335, 342; 375/140, 141, 144, 146, 147, 148

(56) References Cited

U.S. PATENT DOCUMENTS

| 5,884,187 A | | 3/1999 | Ziv et al. | |
|---|---|---|---|---|
| 5,892,774 A | * | 4/1999 | Zehavi et al. | 370/527 |
| 5,933,787 A | | 8/1999 | Gilhousen et al. | |
| 5,963,870 A | * | 10/1999 | Chheda et al. | 455/522 |
| 5,982,760 A | | 11/1999 | Chen | |
| 5,987,326 A | * | 11/1999 | Tiedemann et al. | 455/442 |
| 6,137,840 A | * | 10/2000 | Tiedemann et al. | 375/297 |
| 6,154,659 A | * | 11/2000 | Jalali et al. | 455/522 |
| 6,253,085 B1 | * | 6/2001 | Bender | 455/442 |
| 6,304,562 B1 | * | 10/2001 | Kim et al. | 370/332 |
| 6,366,778 B1 | * | 4/2002 | Bender et al. | 455/442 |
| 6,396,867 B1 | * | 5/2002 | Tiedemann et al. | 375/141 |
| 6,515,975 B1 | * | 2/2003 | Chheda et al. | 370/332 |
| 6,526,031 B1 | * | 2/2003 | Zaff et al. | 370/335 |

* cited by examiner

Primary Examiner—Nay Maung
Assistant Examiner—Tan Trinh
(74) Attorney, Agent, or Firm—Haynes and Boone, LLP (57) ABSTRACT

A method and network element for fast forward power control in a CDMA network includes establishing an artificial FPC_SUBCHAN_GAIN parameter having a value different from an actual FPC_SUBCHAN_GAIN parameter. The actual FPC_SUBCHAN_GAIN parameter represents an actual amount of power by which a punctured bit has been increased or decreased. The artificial FPC_SUBCHAN_GAIN parameter is substituted in place of the actual FPC_SUBCHAN_GAIN parameter during fast forward power control. The value of the artificial FPC_SUBCHAN_GAIN parameter is selected to compensate for a diversity gain occurring as a result of an adding of a link or a dropping of a link between at least one base station transceiver and a mobile station. Lastly, the artificial FPC_SUBCHAN_GAIN parameter is sent from the at least one base station transceiver to the mobile station.

31 Claims, 8 Drawing Sheets

METHOD AND APPARATUS FOR IMPROVED FAST FORWARD POWER CONTROL IN A CDMA NETWORK

FIELD OF THE INVENTION

This invention relates generally to telecommunications networks, and more particularly, to a method and system for improved fast forward power control in a CDMA network.

BACKGROUND OF THE INVENTION

As known in the art, forward link processing for the power control subchannel gain is handled in the following manner. At the base station controller (BSC), for each call, the BSC monitors whether or not a soft handoff state has changed. If there was no soft handoff state change, the BSC then continues to monitor. If the BSC detects that the soft handoff state has changed, then the BSC determines whether or not a change is required for the forward power control subchannel gain (FPC_SUBCHAN_GAIN). If no change is required for FPC_SUBCHAN_GAIN, then the BSC returns to the step of monitoring whether or not a soft handoff state has changed.

If a change is required for FPC_SUBCHAN_GAIN, then the BSC sends a message to the relevant base transceiver stations (BTSs) in soft handoff with the mobile station to increase/decrease the power of the punctured bits by a predetermined amount relative to the power of full rate (i.e., 9600 bps or 14400 bps) frames. The BSC also generates a message to notify the mobile station (MS) via an FPC_SUBCHAN_GAIN parameter that the MS is to expect a change in the power of the punctured bits by the same amount indicated to the BTS(s).

At the BTS(s), each BTS monitors for receipt of an FPC_SUBCHAN_GAIN notification from the BSC. Upon receipt of such an FPC_SUBCHAN_GAIN notification, the BTS changes the power on all outgoing punctured power control bits to reflect the change of the FPC_SUBCHAN_GAIN. There may or may not be an action time associated with this command. In other words, the BSC may notify the BTS(s) that they should update the gain on the power control subchannel at some time relative to system time. This is to give the mobile station time to receive and process the message informing it about the change in the power control subchannel gain. Generally, if the mobile and system are synchronized in such a fashion, the performance is optimized. If the BTS(s) were to increase/decrease the gain right away, the mobile station will ask the BTS(s) to power down/up, as it will classify a change of subchannel gain as a change in the channel characteristic rather than a change in the system settings.

At the MS, the MS monitors for an arrival of a notification message requesting the MS of a change to the FPC_SUBCHAN_GAIN. Upon detection of such a notification of a change to the FPC_SUBCHAN_GAIN, the MS determines from the FPC_SUBCHAN_GAIN parameter what the required change of power to the punctured bits will be.

According to the IS 2000 standard, the FPC_SUBCHAN_GAIN parameter is a five bit number, a least significant bit indicative of a 0.25 dB increment of change. At present, the standard allows only positive numbers, i.e., the five-bit number is not in two's complement. As a result, the gain on the power control subchannel is either equal to the power of the rest of the forward traffic channel bits at full rate or greater.

Subsequent to determining from the FPC_SUBCHAN_GAIN parameter the power of the punctured bits, the MS takes appropriate action to either adjust a current target Eb/No (Eb/No being representative of a bit-to-noise spectral density ratio or normalized energy per bit) to reflect the change, or scale the measured Eb/No for every power control group additively to account for the change.

The mobile station uses the target Eb/No as a means of providing fast forward link power control feedback to the network. If the measured Eb/No changes relative to the expected target Eb/No, the mobile station can provide the appropriate feedback. Consequently, changing the gain on the subchannel (which is what the MS uses to measure the Eb/No) without informing the MS will disrupt the power control feedback process.

In connection with wireless communications, diversity gain is a power level differential characteristic of wireless communications encountered during the adding or dropping of a link between one or more base stations (BTSs) and a mobile station (MS). As a result, this disrupts the power control feedback process. For instance, when the system enters into two-way soft handoff from one way soft handoff, the power required per sector (or cell) is not simply halved. This would be the case if there were no diversity gain. With diversity gain, however, the total power required from both sectors is less (in some cases much less) than the power required from one sector alone if the mobile station was not in soft handoff with the other sector.

Prior methods for solving the problem of diversity gain in a CDMA network have included a base station ignoring power control commands up/down, for a very short period when decreasing/increasing a corresponding base station controller (BSC) active set. The BSC active set is a set of identities that represent a number of sectors (e.g. up to six sectors) that the mobile is currently using to receive and transmit information to/from the network. For example, if the active set contains the identity of four sectors, then the corresponding four sectors are currently demodulating information transmitted by the mobile (providing selection diversity) and also transmitting to the mobile. The mobile may then choose to demodulate energy from all sectors or some sectors within the given cell or neighboring cell(s), depending on the number of RAKE fingers at the mobile station and the relative strengths of all the distinct signals coming to the mobile. By ignoring the power control commands, the base station allows the SNR threshold to settle and catch up to the diversity gain. However, such a method consumes valuable time, is inefficient and has the potential to reduce a stability of the CDMA system.

SUMMARY OF THE INVENTION

A method and network element for fast forward power control in a CDMA network includes establishing an artificial FPC_SUBCHAN_GAIN parameter having a value different from an actual FPC_SUBCHAN_GAIN parameter. The actual FPC_SUBCHAN_GAIN parameter represents an actual amount of power by which a punctured bit has been increased or decreased relative to the power on the rest of the forward link frames, assuming the frame was a full rate frame at 9600 bps (or 14000 bps depending on the Radio Configuration option). The artificial FPC_SUBCHAN_GAIN parameter is substituted in place of the actual FPC_SUBCHAN_GAIN parameter during fast forward power control. The value of the artificial FPC_SUBCHAN_GAIN parameter is selected to compensate for a diversity gain occurring as a result of an adding of a link or a dropping of a link between at least one base station transceiver and a mobile station. Lastly, the artificial FPC_SUBCHAN_GAIN parameter is sent from the at least one base station transceiver to the mobile station.

DESCRIPTION OF THE EMBODIMENTS

Figure 1:
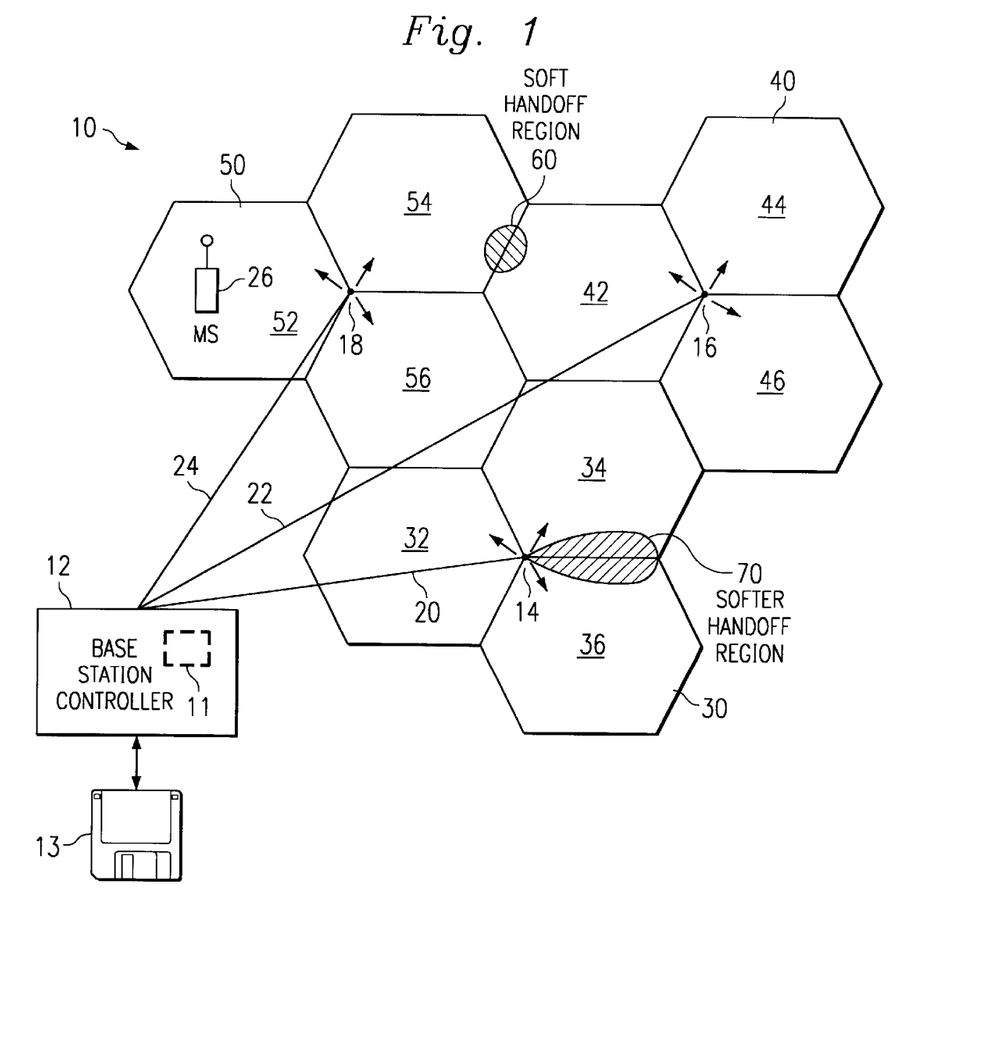
FIG. 1 shows a plan view of a CDMA network according to an embodiment of the present disclosure.

With reference to FIG. 1, a CDMA network 10 includes a base station controller (BSC) 12 operatively coupled to base transceiver stations (BTSs) 14, 16, and 18 via high capacity connections 20, 22, and 24, respectively. High capacity connections may include T1-links, OC-3 links or other suitable connections, for example.

Network 10 further includes a plurality of cells 30, 40, and 50. Each of the cells include a number of sectors, for example, three (3) sectors each. Note that the network may contain additional cells (not shown) and that each cell may have more than three sectors, according to a particular CDMA network implementation. Sectors 32, 34, and 36 are part of cell 30 in conjunction with BTS 14. Sectors 42, 44, and 46 are part of cell 40 in conjunction with BTS 16. Sectors 52, 54, and 56 are part of cell 50 in conjunction with BTS 18. As shown, each cell site employs antennas directed in a specific direction, represented by arrows emanating from a respective BTS.

Referring still to FIG. 1, the region designated by reference numeral 60 represents a soft handoff region. A mobile station (MS) 26 that enters the soft handoff region would experience a soft handoff (i.e., soft handoff between sectors of different cells). The region designated by reference numeral 70 represents a softer handoff region. A mobile station that enters within the softer handoff region 70 would experience a softer handoff (i.e., softer handoff between sectors of the same cell).

Figure 2:
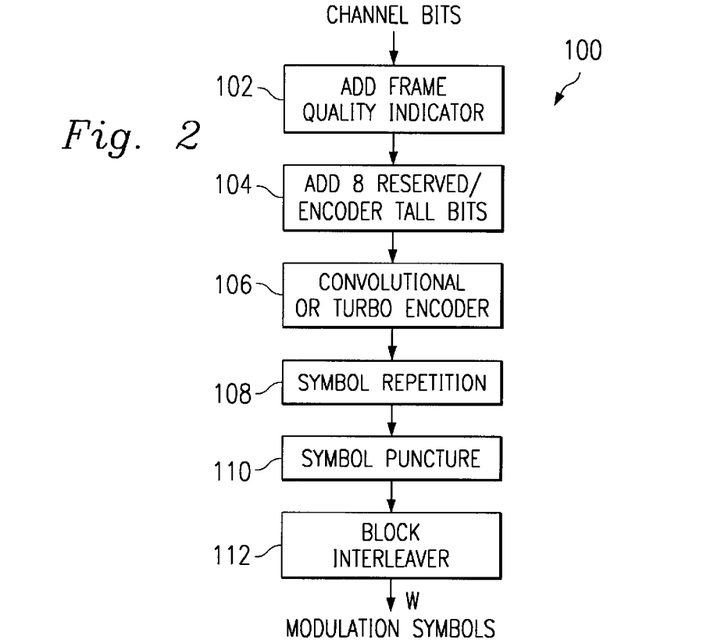
FIG. 2 shows a block diagram view of system components for structuring forward link frames for use in the CDMA network of FIG. 1.

Turning now to FIG. 2, a forward link frame can be structured/designed by the BSC or BTS(s) according to the international standard IS 2000 using a forward fundamental channel configurator 100. Configurator 100 receives channel bits at an input, processes the channel bits, and outputs modulated symbols W. Configurator 100 includes an add frame quality indicator process block 102, an add eight (8) reserved/encoder tall bits process block 104, a convolution (or turbo) encoder process block 106, a symbol repetition process block 108, a symbol puncture process block 110, and a block interleaver 112. The components of configurator 100 are known in the art and not discussed in detail herein.

Figure 3:
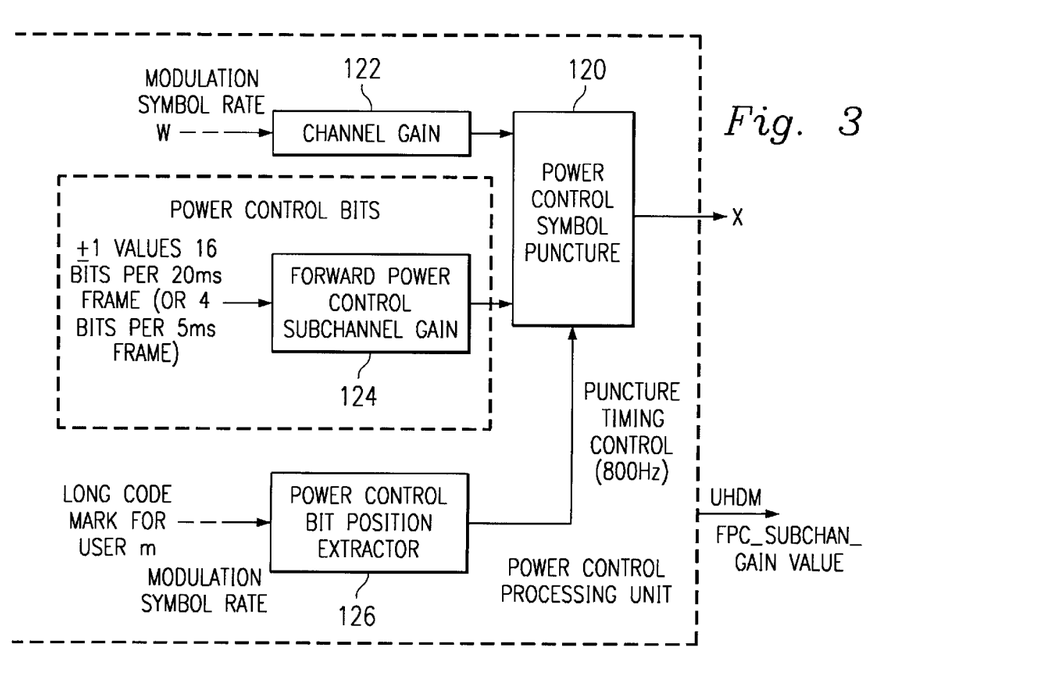
FIG. 3 illustrates a block diagram view of a power control processing unit for power control symbol puncturing on forward fundamental channel with the CDMA network of FIG. 1.

Referring now to FIG. 3, BSC 12 (FIG. 1) utilizes various components, including a power control symbol puncture unit or process block 120, in connection with power control symbol puncturing of channel bits X on the Forward Fundamental Channels and Forward Dedicated Control Channels. A channel gain unit 122 modifies modulated symbols W and outputs the modified modulated symbols W to the power control symbol puncture unit 120. Forward power control subchannel gain unit 124 modifies power control bits and outputs the modified power control bits to the power control symbol puncture unit 120. Lastly, a power control bit position extractor unit 126 modifies a long code mark for user m for providing puncture timing control (on the order of 800 Hz) to power control symbol puncture unit 120.

Figure 4:
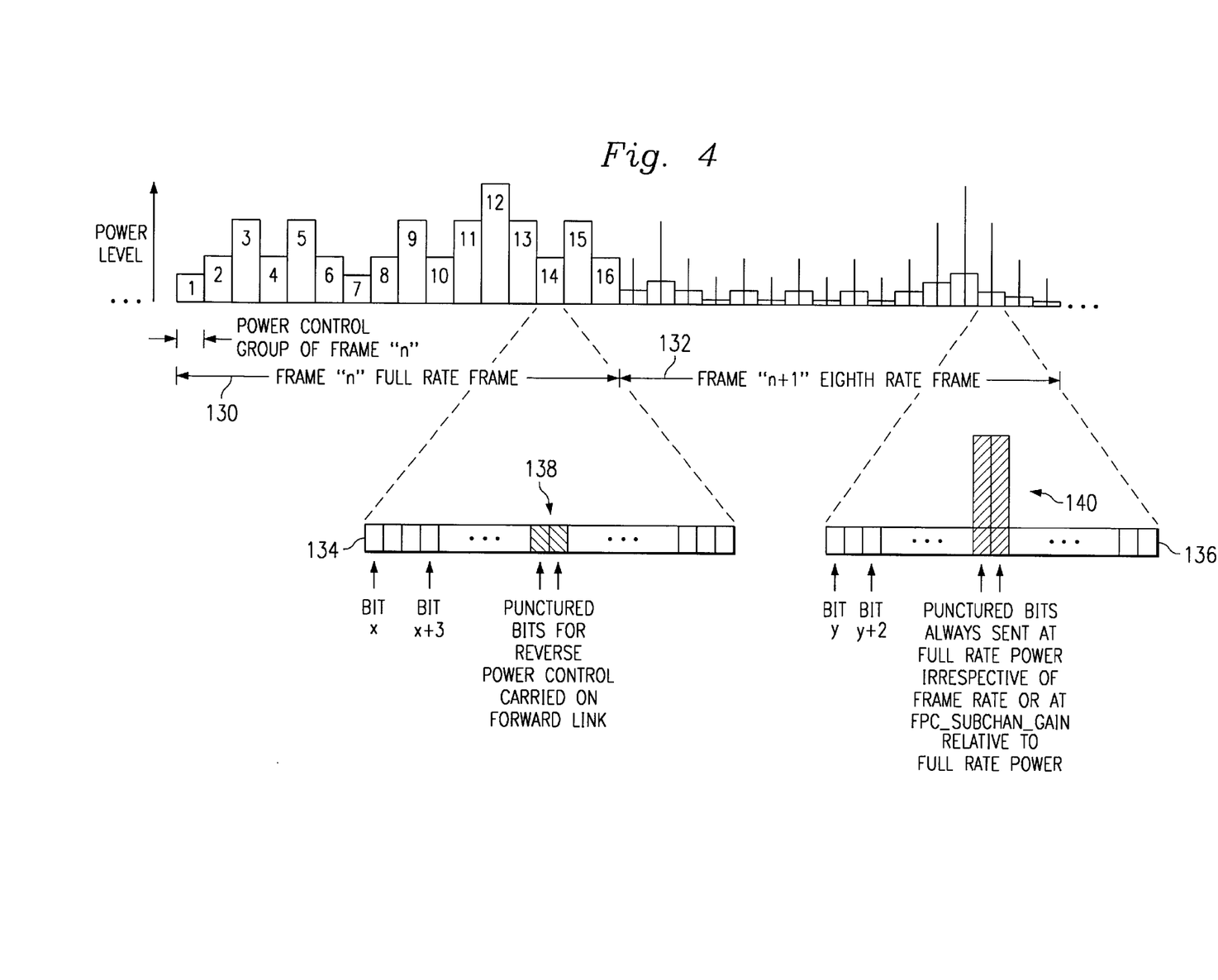
FIG. 4 is a diagram view of a full rate frame and a one-eight rate frame illustrating punctured bits for reverse link power control in connection with the present embodiments.

Turning now to FIG. 4, exemplary frames "n" and "n+1" are illustrated as a function of power level. Frame "n" (denoted by reference numeral 130) is a full rate frame. Frame "n+1" (denoted by reference numeral 132) is an eighth rate frame. Each of the frames 130 and 132 includes sixteen (16) power control groups.

To illustrate how power of the punctured bits on the forward link frame is decoupled from power on the frame itself, consider an exemplary power control group 134 from frame "n" and an exemplary power control group 136 from frame "n+1". Each power control group has a number of bits, including punctured bits, 138 and 140, respectively. The punctured bits 138 and 140 are sent at full rate power irrespective of frame rate or at FPC_SUBCHAN_GAIN relative to full rate power. The punctured bits are for power controlling the mobile station, otherwise known as reverse power control by those skilled in the art, and is carried on the forward link. Note that power on the punctured bits 140 differs from power of power control group 136, as well as on the rest of the frame 132. Except for the punctured bits, power on the rest of the frame 132 is based on the rate of frame. However, power control bits are always sent at full rate power or relative to full rate power. Accordingly, a MS does not need to know the frame rate (which the MS would not know anyway until the end of a frame plus some additional processing delay when the MS uses a frame rate determination algorithm) per power control group. The MS can estimate Eb/No or channel conditions from the punctured bits.

Figure 5:
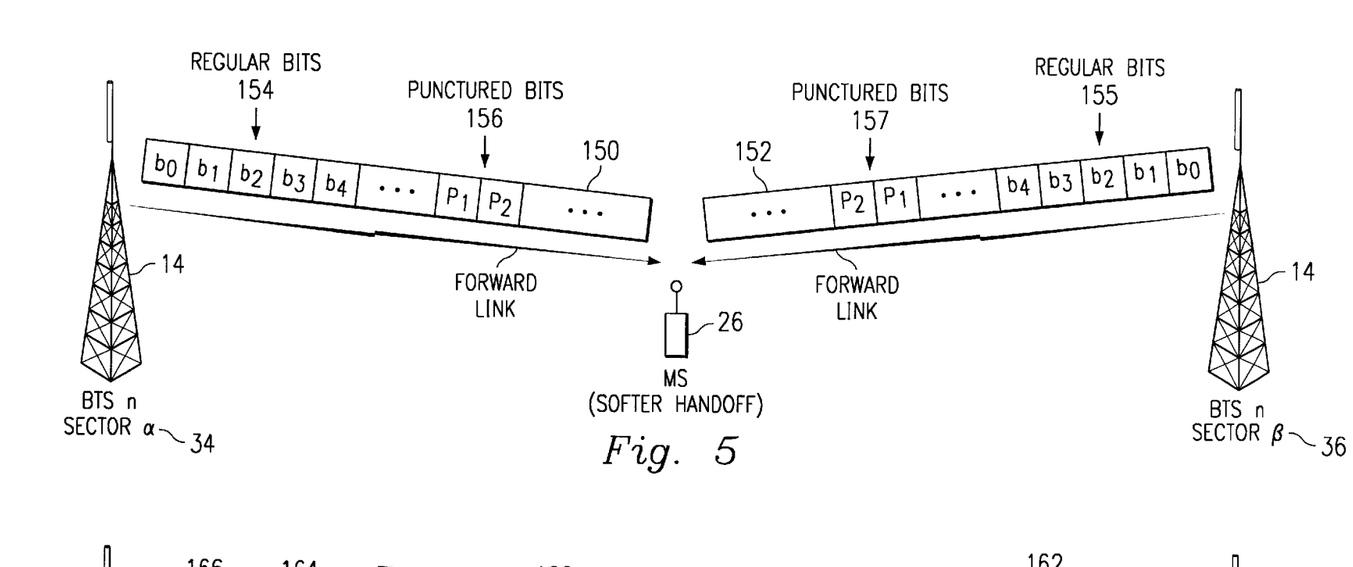
FIG. 5 is a diagram view of an exemplary softer handoff using the CDMA network of FIG. 1.

Referring briefly to FIG. 5, an example involving a 2-way softer handoff shall be discussed. In this example, frames 150 and 152 are identical full rate frames, including regular bits 154, 155 and punctured bits 156, 157, respectively. As a result, the information contained within the frames can be "soft" combined at the MS 26 for diversity gain purposes. Because the punctured bits are from the same cell 30, the punctured bits represent the same decision and can also be soft combined. Hence, extra power relative to full rate is not needed on the punctured bits in this instance. Note, that in these regions, interference is high because cells are transmitting signals (interference to each other) to a point with similar receive power effects.

Figure 6:
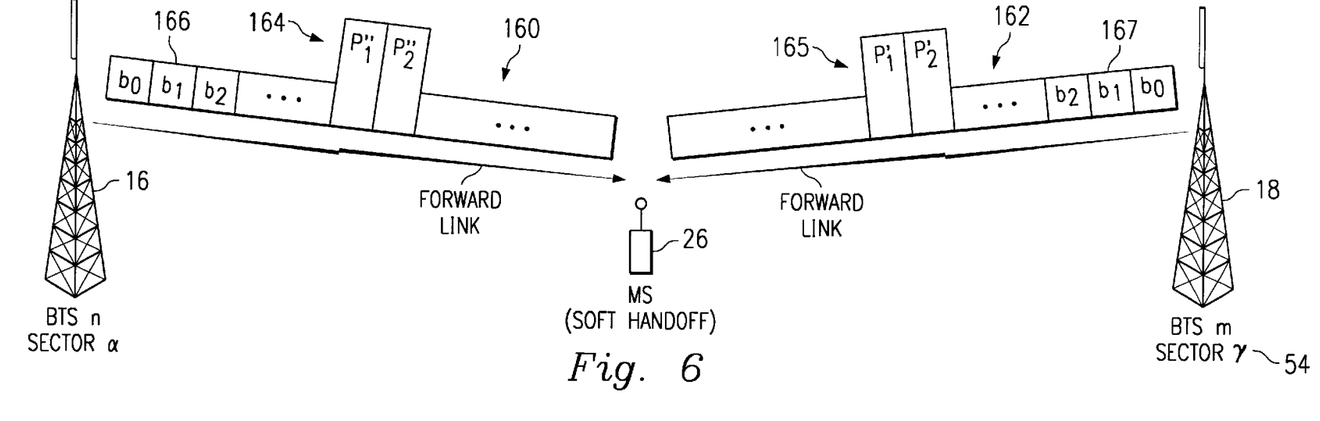
FIG. 6 is a diagram view of an exemplary soft handoff using the CDMA network of FIG. 1.

Turning briefly to FIG. 6, an example involving a 2-way soft handoff shall be discussed. In this example, frames 160 and 162 are non-identical frames. Frame 160 includes regular bits 164 and punctured bits 166. Frame 162 includes regular bits 165 and punctured bits 167. The information contained in the regular bits of frames 160 and 162 are identical in that the coded symbols b0, b1, b2, . . . are the same; however, P1", P2" AND P1', P2' may not be identical since they represent reverse power control decisions coming from separate cells. Accordingly, these particular punctured bits cannot be soft combined, and must be processed/demodulated separately. As a result, more power is needed on these punctured bits in a soft handoff region to ensure a correct reception (i.e., error-free) and, furthermore, so that the corresponding MS can take necessary power control adjustments. Since the MS uses the power of the punctured bits to estimate Eb/No, the MS must be informed thereof if power has been scaled. Otherwise the MS can mistake the power increase/decrease on the punctured bits as a change in the RF channel, rather than a change in system parameters.

With respect to power control processing by the BTS(s), a BTS transmits a forward link frames on a frame by frame basis. There exists both an inner loop power control process and an outer loop power control process. The inner loop power control process is at 800 Hz, while the outer loop power control process is at 50 Hz. For every 50 Hz frame, there are sixteen (16) power control groups.

With respect to fast forward power control processing at the BTS(s) indicated by reference numeral 170 in (FIG. 7A), such power control processing occurs for every power control group of a frame. For each power control group of a frame, the BTS(s) demodulate the power control decision received on the reverse link power control subchannel from the mobile station (Step 172). The reverse link power control subchannel carries the fast forward power control decision to the BTS(s).

Figures 7A, 7B, 7C:
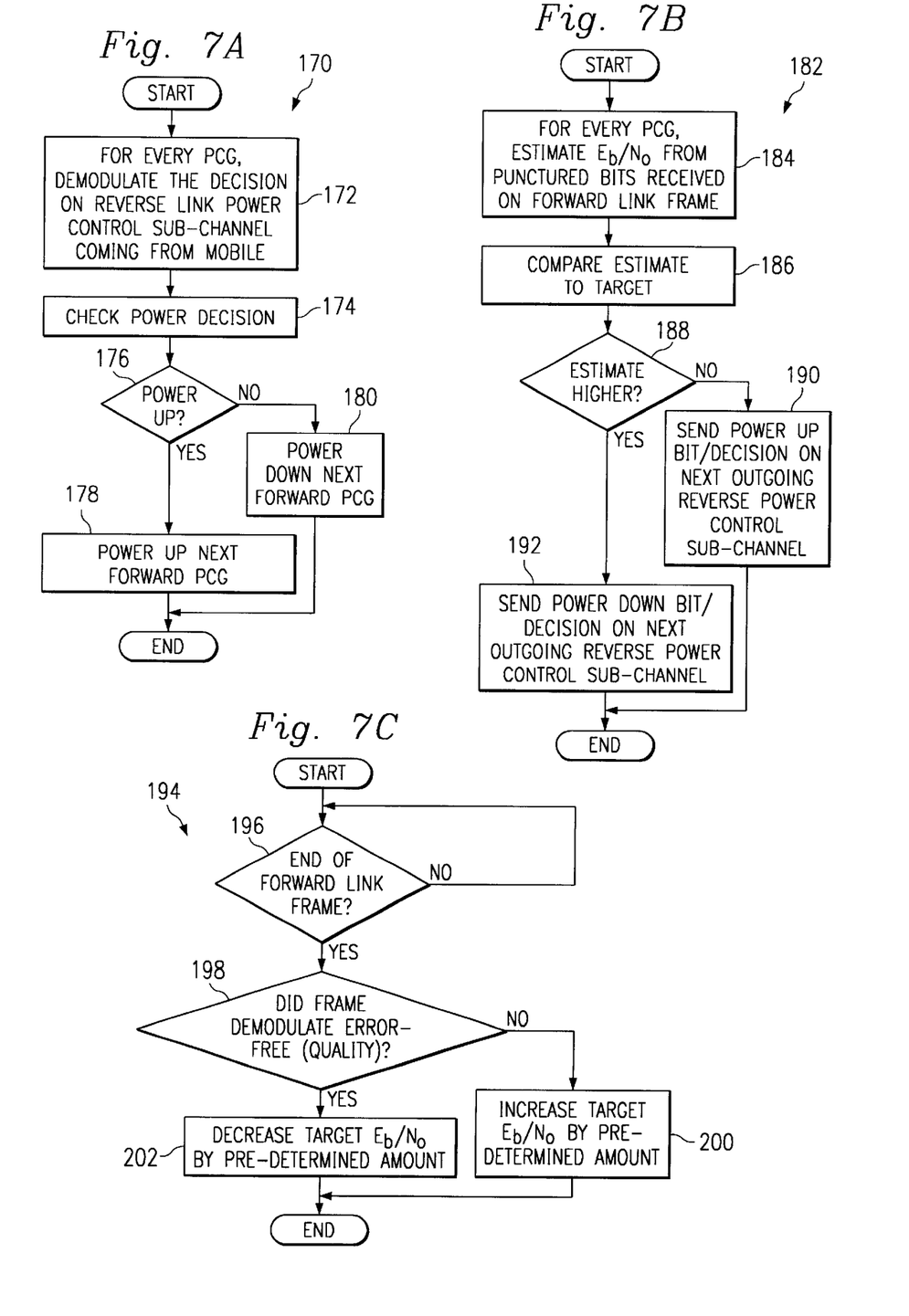
FIGS. 7A, 7B, and 7C are flow diagram views of power control processing by the BTS(s), a MS during inner loop power control, and a MS during outer loop power control.

A corresponding BTS checks the power control decision (Step 174), whether it is to power up or to power down (Step 176). If the BTS determines the power control decision to be a power up decision, then the BTS powers up a next outgoing forward power control group (Step 178). If the BTS determines the power control decision to be a power down decision, then the BTS power downs the next outgoing forward power control group (Step 180). With respect to either a power up or a power down, the amount of the power up/down is a predetermined amount per the requirements of a particular CDMA network administrator. For example, the predetermined amount may include ±1.0 dB, ±0.5 dB, ±0.25 dB, or some other amount.

With respect to MS inner loop power control processing at the mobile station (indicated by reference numeral 182 in FIG. 7B), for every power control group of a frame, the MS estimates Eb/No from the punctured bits (Step 184). Upon obtaining an estimate, the MS compares the estimate to a target or threshold (Step 186). In Step 188, the MS queries if the estimate is higher than the target. If the comparison indicates that the estimate is lower than the target, then the MS sends a power up decision on the next outgoing reverse link power control subchannel to the BTS(s) (Step 190). Similarly, if the comparison indicates that the estimate is higher than the target, then the MS sends a power down decision on the next outgoing reverse link power control subchannel to the BTS(s) (Step 192).

In addition, with respect to MS outer loop power control processing (indicated by reference numeral 194 in FIG. 7C), the MS also monitors a given frame for an end of the forward link frame, on a frame-by-frame basis (Step 196). Upon detecting an end of frame, the MS next determines whether or not the frame demodulated error-free (i.e., is of sufficient quality) (Step 198)? If the frame did not demodulate error-free, then the MS increases the target Eb/No by a predetermined amount (Step 200). Similarly, if the frame did demodulate error-free, then the MS decreases the target Eb/No by a predetermined amount (Step 202). The increase and decrease of the target Eb/No is mathematically related to ensure that the target frame error rate (FER) requirements of system can be met. While the above description of the mobile station is based on what is known in the art, the mobile processing may be different than what is mentioned above. Note, however, that this will not affect the outcome or performance of embodiments of the present disclosure, as there are certain minimum performance specifications that all mobiles must adhere too.

According to the present embodiments, forward power control subchannel gain processing is handled in the following manner. At the BSC (indicated by reference numeral 210 in FIG. 8A), for each call, the BSC monitors whether or not a soft handoff state has changed (Step 212). If there were no soft handoff state change, then the BSC continues to monitor. If the BSC detects that the soft handoff state has changed, then the BSC determines whether or not a change is required for the forward power control subchannel gain (FPC_SUBCHAN_GAIN) to the BTS(s) (Step 214). If a change is required for the FPC_SUBCHAN_GAIN, then the BSC determines the actual amount to increase/decrease required for the power of the punctured power control bits (i.e., actual FPC_SUBCHAN_GAIN) (Step 216). If no change is required for the FPC_SUBCHAN_GAIN, then the BCS sends current values to the BTS(s) and the MS (Step 222). Alternatively, the BSC determines whether or not an artificial FPC_SUBCHAN_GAIN is required for transmission to the mobile station, further as discussed herein.

Figure 8A:
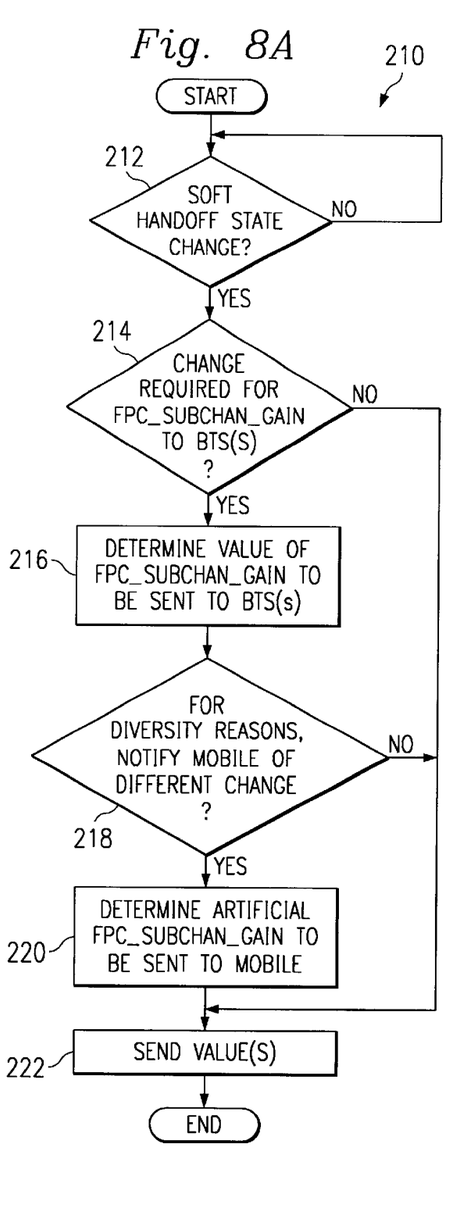
FIGS. 8A, 8B, and 8C are flow diagram views of FPC_SUBCHAN_GAIN processing by the BSC, BTS, and MS according to one embodiment of the present disclosure.

In a next step (Step 218), the BSC makes a determination whether or not, for diversity gain or other reasons, the BSC desires to notify the mobile station of a different change, i.e., notify the MS of an artificial FPC_SUBCHAN_GAIN parameter. In other words, the BSC determines whether or not a change from the actual FPC_SUBCHAN_GAIN parameter is required for transmission to the mobile station. If a change in the FPC_SUBCHAN_GAIN parameter is required, then the BSC determines the artificial FPC_SUBCHAN_GAIN parameter to be sent to the mobile station (Step 220). The artificial FPC_SUBCHAN_GAIN parameter differs from the actual FPC_SUBCHAN_GAIN implemented at the BTS(s), as further discussed herein. The artificial FPC_SUBCHAN_GAIN then becomes representative of the then current FPC_SUBCHAN_GAIN parameter to be sent to the MS. The BSC then sends notification to the BTS(s) to adjust the power to the punctured power control bits by the actual FPC_SUBCHAN_GAIN amount, while sending the artificial FPC_SUBCHAN_GAIN parameter to the MS (Step 222).

Note that there may or may not be an action time associated with these commands. In other words, the BSC may notify the BTS(s) that they should update the gain on the power control subchannel at some time relative to system time. This is to give the mobile station time to receive and process the message informing it about the change in the power control subchannel gain. Generally, if the mobile and system are synchronized in such a fashion the performance is optimized. If the BTS(s) were to increase/decrease the gain right away, the mobile station will ask the BTS(s) to power down/up as it will classify a change of subchannel gain as a change in the channel characteristic, rather than a change in the system settings.

On the other hand, if an artificial FPC_SUBCHAN_GAIN parameter is unnecessary, then the BSC sends notification to the BTS(s) to adjust the power to the punctured power control bits by the actual FPC_SUBCHAN_GAIN amount, while also sending the actual FPC_SUBCHAN_GAIN parameter value to the MS (Step 222). Again in this condition, the BSC may choose to assign an action time.

Accordingly, the network BSC determines when soft handoff state changes, and whether or not it wants to account for diversity gain. The BSC notifies the BTS(s) to modify the power on the punctured power control bits (whether increased or decreased) by the actual amount of forward power control subchannel gain. To account for diversity gain, the BSC informs the mobile station (or causes the mobile station to be informed) of a different amount of FPC_SUBCHAN_GAIN (i.e., different from the actual amount). The different amount of FPC_SUBCHAN_GAIN represents a prescribed artificial FPC_SUBCHAN_GAIN. Informing the MS of the artificial amount of FPC_SUBCHAN_GAIN has the effect of immediately forcing the MS to power down/up by an extra step (or steps), which immediately takes into account for diversity gain/loss, respectively. Ramifications for not implementing the artificial FPC_SUBCHAN_GAIN, as discussed herein, include potentially undesirable increases in frame error rate (FER) in some cases, or wasted power in other cases.

Figure 8B:
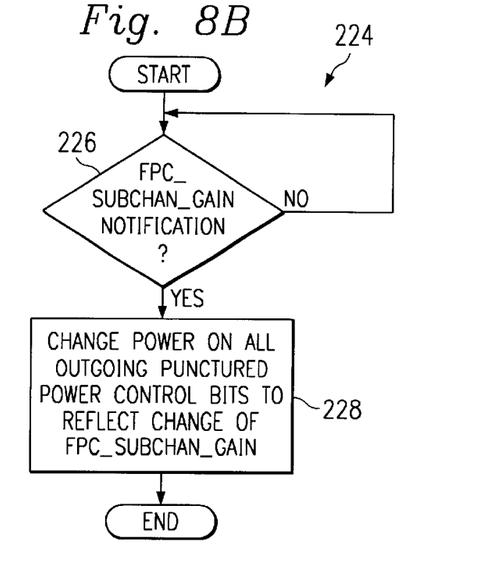
Figure 8C:
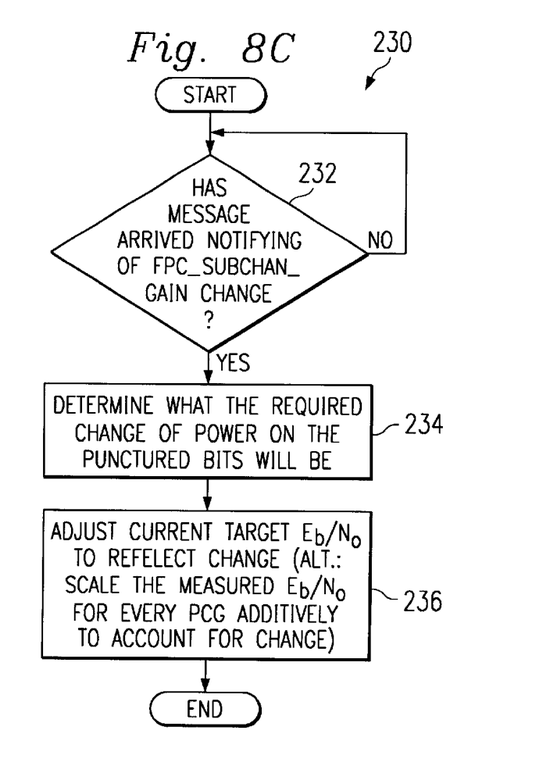

Flow diagram views of FPC_SUBCHAN_GAIN processing by the BTS and MS are illustrated in FIGS. 8B and 8C, respectively. In FIG. 8B, FPC_SUBCHAN_GAIN processing by the BTS is generally indicated by reference numeral 224. In step 226, the BTS determines whether or not a FPC_SUBCHAN_GAIN notification has been received. If there is no FPC_SUBCHAN_GAIN notification, then the BTS continues to monitor. If there is a FPC_SUBCHAN_GAIN notification, then in step 228, the BTS changes power on all outgoing punctured power control bits to reflect the change of FPC_SUBCHAN_GAIN according to the FPC_SUBCHAN_GAIN notification.

In FIG. 8C, FPC_SUBCHAN_GAIN processing by the MS is generally indicated by reference numeral 230. In Step 232, the MS monitors whether or not the MS has received a message notifying the MS of a FPC_SUBCHAN_GAIN change. If there is no FPC_SUBCHAN_GAIN notification, then the MS continues to monitor. If there is a FPC_SUBCHAN_GAIN notification, then in Step 234, the MS determines from the notification what the required change of power on the punctured bits will be. If Step 236, the MS adjusts the current target Eb/No to reflect the change. Alternatively, the MS scales the measured Eb/No for every power control group to account for the change.

Figure 9:
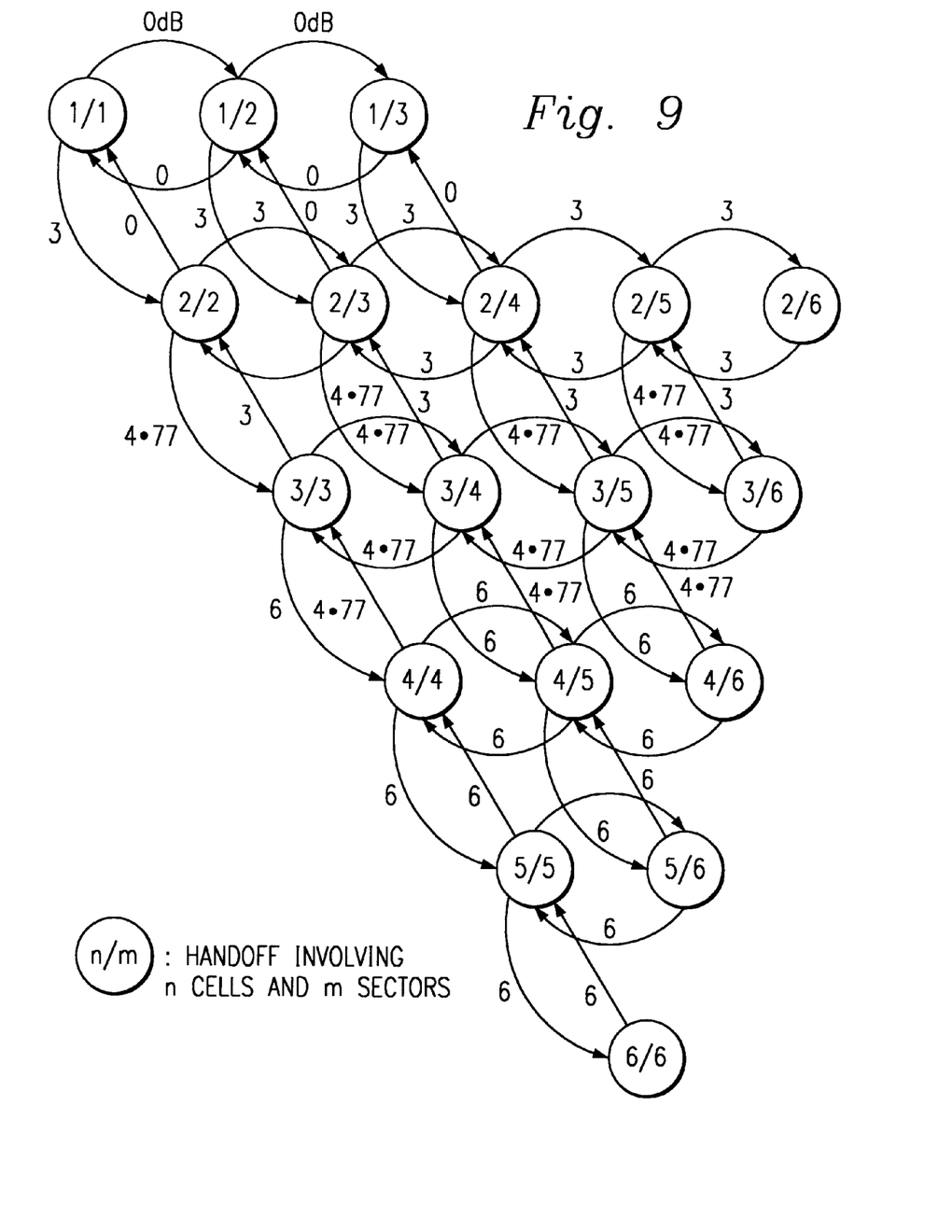
FIG. 9 is a state flow diagram view of changes in power on power control bits relative to full rate transmission provided by the BSC to the BTS(s) according to one embodiment of the present disclosure.

FIG. 9 is representative of a exemplary state diagram illustrating the information that the BSC sends to the BTS(s) for changing power (whether an increase or a decrease) on the punctured power control bits, relative to full rate power. All numbers of FIG. 9 indicated between handoff states are in units of dB. In FIG. 9, each circle containing (n/m) is representative of a handoff involving (n) cells and (m) sectors. The numbers shown are for illustration purpose only; actual numbers used would be established by network operators according to various prescribed optimization techniques.

Figure 10:
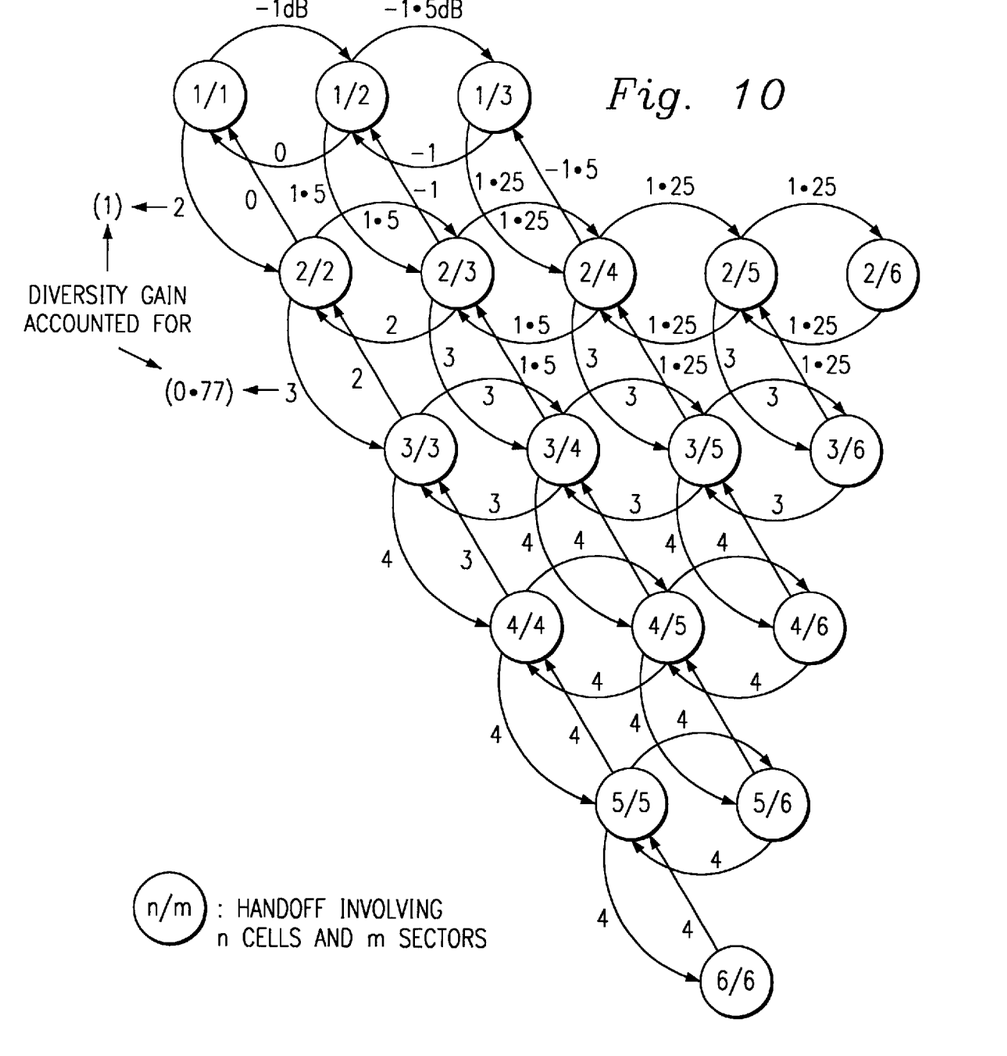
FIG. 10 is a state flow diagram view of changes in power on power control bits relative to full rate transmission provided by the BSC to the MS with respect to the corresponding handoffs of FIG. 9, according to an embodiment of the present disclosure.

FIG. 10 is representative of a exemplary state diagram according to one embodiment of the present disclosure, illustrating the information that the BSC sends to the MS for notifying the MS about the change in power (whether an increase or a decrease) on the punctured power control bits, relative to full rate power. In FIG. 10, each circle containing (n/m) is representative of a handoff involving (n) cells and (m) sectors. The numbers indicated between handoff states represent artificial FPC_SUBCHAN_GAIN values, in units of dB. The numbers shown are for illustrative purposes only; actual numbers to e used would be established and/or configured by network go operators.

To illustrate the method of the present disclosure, when a MS goes from 1-way to 2-way soft handoff, the BTS(s) are notified to increase power on punctured bits by 3 dB relative to full rate transmission. The MS is notified via the artificial FPC_SUBCHAN_GAIN parameter that the power on the punctured bits is only 2 dB relative to full rate transmission. Accordingly, the MS observes about a 1 dB surplus in comparing the measured Eb/No and the target Eb/No and immediately attempts to power down the BTSs. It is important to note a few points. First, the MS would power down the BTSs immediately even if notified correctly about the 3 dB change. This is because both BTSs are transmitting power that moments before one BTS was transmitting at, hence the MS would have to lower the overall power received. It is expected that the MS would use Maximal-Ratio-Combining, which means that the total Eb/No is the sum of the Eb/No of each resolvable signal path demodulated by the mobile station. As a result, the mobile station would then lower the forward link power by feedback such that the power transmitted by both BTSs is received at the mobile and combined to ensure the same target Eb/No prior to the handoff. Second, since the MS is notified about a 2 dB increase in the subchannel gain via the artificial FPC_SUBCHAN_GAIN parameter (rather than 3 dB), the MS further tries to lower the forward link power from each BTS such that the received Eb/No is now about a dB less than before, thereby accounting quickly for diversity gain. Diversity gain implies a reduction in the required Eb/No for a given grade of service. Third, if the MS had been notified correctly about the 3 dB change, then it would not power down the BTSs by the additional amount just described. Consequently, with this third point, the diversity gain provided by two-way handoff over one-way handoff will be accounted for much more slowly, in this case a slow lowering of the target Eb/No as good frames are received.

Transitioning back from 2-way to 1-way, the BTS(s) are notified to use 0 dB, and the MS is also notified to expect 0 dB. However, the MS assumes that the change in signal will be from 2 dB relative power to 0 dB relative power, a net 2 dB change. The BTS(s) change the power from 3 dB relative power to 0 dB relative power, a net 3 dB change. Immediately in response thereto, the MS will perceive that the signal has faded by an additional 1 dB and attempt to power up the remaining BTS by more than it would have otherwise done. That is, even if notified of the correct change in power, the mobile station would still quickly power up, as the power being transmitted by the one sector is the same power transmitted by both sectors, prior to dropping one. However, being notified of a different change in subchannel gain allows the MS to power up the BTS by a larger amount, thereby quickly accounting for the loss in diversity gain.

With the embodiments of the present disclosure, it is possible the network operators/manufacturers to choose whether or not to implement a quick power up/down as handoff state changes occur. That is, when the BSC notifies the BTSs that one of them is to drop the link with the mobile station, thereby transitioning from two-way to one-way handoff, the BSC can also command the remaining BTS to start transmitting, for example, at 3 dB more power than it currently is. In this case, the MS may power up the remaining BTS a little more or power down a little to get back the original target Eb/No, but the original target Eb/No may itself have been modified by the artificial FPC_SUBCHAN_GAIN. This example can work in the other direction as well. When the BSC notifies a second BTS to go into handoff with a MS along with a currently used neighboring BTS, the BSC can inform the BTSs to use a power, for example, 3 dB lower than what the current BTS was just using.

To further illustrate the method of the present disclosure, consider a MS transitioning from a one-way handoff to a two-way soft handoff. Also consider that the MS is in a particularly bad fading environment with little natural diversity (e.g., multipath). In this situation, the required Eb/No of the MS to maintain the same grade of service during two-way as one-way may be as much as 4 dB lower. The target Eb/No is controlled by an outer loop process, which is inherently a slow process at 50 Hz. The outer loop process at 50 Hz implies that substantial time can pass before the target Eb/No settles to its new operating point. Generally, the target Eb/No reduces about 0.03–0.05 dB per frame. Accordingly, in this example, a total of 133 frames (i.e., 4 dB÷0.03 dB/frame=133 frames) lasting 2.7 seconds passes before settling to the new steady state. During this period, the target Eb/No is higher than is required for the given GOS, which means the forward link power is also higher than is required. If a typical sector carries 20–30 MS users during a busy hour, and each cell is a tri-sectored cell with about 500 cells in a metropolitan area, then there can potentially be about 45000 simultaneous users. In such cases, even a small fractional gain in power usage efficiency can result in hundreds (100's) of extra MS users in the network. Accordingly, the present embodiments utilize the benefits of the inner loop power control process (operating at 800 Hz) to reduce the power immediately (or in a rapid manner), rather than relying on the outer power control loop to do so. According to the present embodiments, the mobile station is notified of a certain increase in FPC_SUBCHAN_GAIN, while the BTS(s) are instructed to use a different (higher value) FPC_SUBCHAN_GAIN. This has the effect of immediately triggering feedback from the MS to reduce forward link power so that the measured Eb/No and target Eb/No match. The inner loop can work at +/−0.5 dB per power control group, hence the 4 dB diversity gain discussed above can be compensated for in a matter of eight (8) power control groups of ten (10) milliseconds. This amounts to a savings in time on the order of about two hundred seventy (270) times.

To consider another example, the following discussion involves an instance where the soft handoff state transitions from two-way handoff to one-way handoff. Without the method and apparatus of the present disclosure, the outer loop must respond to get back the lost 4 dB diversity gain. Once the transition occurs to one way handoff, the target Eb/No will be insufficient to meet the required GOS. As a result, frame erasures will increase, thereby forcing the target Eb/No up. A typical up step is on the order of about 0.3–0.5 dB. Accordingly, about 8–13 frames are needed to get back to steady state. If a typical call lasts about 90 seconds or 4500 frames and the system expects to operate at a 1% FER, then the system can only tolerate on the order of 45 erasures. However, the FER can potentially increase to 1.3%, degrading the GOS. A main impact in this instance, however, is MS user perception. Generally, a higher FER is not necessarily bad if the frame errors are spaced far enough apart. The spacing of frame errors as far apart as 20 frames may not significantly affect user perception of voice quality. However, if a burst of erasured frames are received, such as discussed in the example above, then the MS user will perceive voice degradation. An example of voice degradation includes muting. Such user perception may have financially negative consequences to the network operator, and ultimately to the network equipment manufacturer. In another example, as a mobile station transitions from (1/1) to (2/2), the BTSs are informed to increase power on the punctured power control bits by 3 dB (FIG. 9). The mobile station, however, is informed via the artificial FPC_SUBCHAN_GAIN parameter of a 2 dB increase (FIG. 10). As a result, the MS will perceive a 1 dB difference between the measured and the target if the channel was flat. Accordingly, the MS attempts to power down the BTSs by sending fast power control commands on the reverse link power control sub-channel. As the MS transitions from (2/2) to (3/3) (FIG. 10), the BTSs are informed by the BSC to increase the power of the punctured power control bits by an additional 1.77 dB (FIG. 9). The MS however is informed via the artificial FPC_SUBCHAN_GAIN parameter that the power is increased to 3 dB (FIG. 10). As a result, the MS expects to see a total change of 1 dB, i.e. 2 dB to 3 dB change, but instead sees a change of 1.77 dB, i.e. 3 dB to 4.77 dB. Accordingly, the mobile station attempts to power down the network by an additional 0.77 dB. The above discussion attempts to show the correlation of both state diagrams, i.e. FIG. 9 and FIG. 10, and the importance in designing the values in any state, as they have an effect in other states.

As discussed herein, in the fast forward power control process, both the reverse and forward links are power controlled at a maximum rate of 800 MHZ. The reverse link power control decisions are sent by a Base Station (BS) (or Base Transceiver Station (BTS)) to a Mobile Station (MS) on a forward link fundamental channel (FCH) or a forward link dedicated control channel (DCCH). The power control decisions are actually punctured onto the FCH or DCCH channels.

With every power control group ($\frac{1}{16}^{th}$ of a frame or 1.25 ms) in an RC4 configuration (as known in the art), (2) two bits are punctured out of (24) twenty-four information bits sent on the FCH. The mobile station uses an OR-OF-THE DOWN rules when the mobile station demodulates corresponding power control decisions.

The OR-OF-THE DOWN rules can be better understood with the following illustration. A mobile station may at any time receive a number of power control bits from a number of base stations. If even one base station requests the MS to power down, the MS powers down. The only way for the MS to power up is if all BTSs request the MS to power up. In otherwords, the number of decisions coming from the different BTSs are demodulated, where 0 (zero) represents a power up request, and a 1 (one) represents a power down request. These decisions are logically OR'ed together and the end result is the command to the MS. Accordingly, only if all decisions are demodulated as 0 (zero) will the MS power up.

During a soft handoff, the particular base stations involved in the handoff may be sending different power control decisions to the mobile station. As a result, it is noted that the mobile station cannot coherently soft combine the punctured power control bits as the mobile station can with punctured bits coming from sectors involved in softer handoff. To minimize reverse link power control error, the punctured power control bits are sent by the respective base station(s) to the mobile station at higher power than the traffic channel bits. The present embodiments use this process (as described in the text and figures) to improve the forward link power control process.

If the mobile station is in a softer handoff (i.e., communicating with two sectors of the same base station), then the forward link power control decisions are the same with respect to the base station(s) (i.e., reverse link power control decisions punctured on the forward link are the same with respect to the base station(s)) because coherently soft combining of the punctured power control bits by the mobile station is possible. Consequently, the resulting extra gain on the punctured power control bits is unnecessary (i.e., not needed).

In a first phase (1XRTT) of third generation (3G) CDMA2000 wireless radio technology, the technology includes fast forward power control. During a 1XRTT voice call, a mobile station assists with the fast forward power control. The MS computes if (i.e., measures) an estimated signal-to-noise ratio (SNR) of the forward link traffic channel and compares the measured SNR to a slowly varying threshold (e.g., on the order of 50 Hz). As determined by the MS, if the measured SNR (as measured per power control group per frame) is lower than the threshold, then the MS sends a power up decision to the corresponding base station (s). If the measured SNR is higher than the threshold, then the MS sends a power down decision to the corresponding base station(s).

The effort between the MS and the corresponding BTS(s) to maintain the channel SNR (or Eb/No) at a given level would generally guarantee a particular grade of service (GOS) (i.e., Frame Error Rate) for the existing then-current channel conditions. If the forward link frames are determined by the mobile station to be in error, then the SNR threshold is increased. If the forward link frame is received correctly, then the SNR threshold is reduced. The increase/decrease step sizes in the SNR threshold are a function of the FER required with respect to the desired GOS. Note that SNR and Eb/No are used interchangeably, herein.

The SNR estimation process discussed herein is based upon punctured bits that are sent on the FCH for reverse link power control. Note that traffic channel bits cannot be used for forward link power control since the rate of each frame of the traffic channel bits is indeterminate (i.e., not known) until the end of the respective frame (i.e., when the MS executes prescribed frame rate determination algorithms). In other words, if the traffic channel bits in the power control group of a given frame were to be used for forward link power control, then it would be necessary to know the frame rate in order to appropriately scale the traffic channel bits during the SNR estimation process. Since the FCH is a variable rate process (and the DCCH is an ON-OFF process), the traffic channel bits cannot be reliably used until the given frame is decoded. By the time the given frame is decoded, it would be too late for using the traffic channel bits for carrying out the SNR estimation process.

Rather than using the traffic channel bits, the SNR estimation process is carried out by the mobile station using the power control bits. The punctured bits are always sent by the BTS(s) relative to a full rate (9600 bps or 14400 bps) transmission. Accordingly, even if the traffic channel bits around the punctured bits are one-eighth ($\frac{1}{8}^{th}$) rate bits, the punctured bits would be at full rate plus some additional power, particularly when a MS is involved in soft handoff. In other words, when the MS is involved in soft handoff, the punctured bits are transmitted with power assuming full rate bits plus some additional power.

For example, assume that a mobile station enters a two way soft handoff state from a one way soft handoff state. If the original base station transmits at power P at some time t, then upon the addition of a second base station (assuming equivalent path loss between both base stations and the mobile station), then both base stations would be powered very quickly to P/2 as a result of forward link power control. Eventually, the sectors will be powered down further to account for diversity gain obtained by using two forward links to transmit to the mobile station. This scenario provides diversity, given that the same exact information is transmitted from both sectors to the mobile station, so that if one sector suffers a severe fade, then the likelihood of losing all the information is reduced as the second sector is statistically unlikely to also be in such a fade.

However, the punctured power control bits could generally represent different reverse link power control decisions. As a result, the mobile station cannot soft combine these punctured power control bits like the remainder of the traffic channel bits, hence the punctured power control bits have no diversity gain. Such punctured power control bits have to be transmitted at higher power. In general, when in a soft handoff region, the interference power is higher as a number of sectors are comparable in strength and are interfering with one another. However, if the power on the punctured bits is increased (for example, doubled), and the mobile station was not aware of this increased power on the punctured bits, then the power from each base station would drop to P/4 as a result of the reverse link power control. If the mobile station is unaware of the power gain on these punctured bits RELATIVE to the traffic channel bits, then the mobile station may think that the channel is suddenly in an up-fade (i.e., constructive addition of signals) or experiencing good channel conditions. Accordingly, the mobile station will attempt to power control the forward link down to the original point.

Recall that the mobile station is estimating the SNR from the punctured bits and trying to match this by power controlling to a slowly varying threshold. Increasing the gain on the punctured bits without notifying the mobile station will disrupt this process. For a given grade of service (GOS), the power drop to P/4 in the above example is highly undesirable (i.e., not good). A decrease in transmit power level correlates with an increase in FER. Similarly, an increase in transmit power level correlates with a decrease in FER.

According to the IS 2000 standard, CDMA networks or systems (via the BTS(s)) are allowed to notify a mobile station (or mobile stations) of the power on the punctured bits relative to the full rate bits. Notification is accomplished with a forward power control subchannel gain parameter referred to as FPC_SUBCHAN_GAIN. The FPC_SUBCHAN_GAIN parameter is sent by the BTS(s) in a Universal Handoff Direction Message (UHDM) when adding/dropping a link, including a soft handoff, for example.

Consider the following with respect to the above discussed example. If the CDMA network notifies the mobile station that the gain on the punctured bits is to increase by 3 dB, then as a result of the reverse link power control, the power on the base stations would only drop to P/2 each. However, such a power drop does not account for the soft handoff diversity gain. Accordingly, the power of the base stations would drop a little more than P/2 each (i.e., decrease to a level slightly more than P/2 each). The mobile station would continue to receive good frames, and slowly drop the SNR threshold to account for the diversity gain.

The embodiments of the present disclosure provide a method and apparatus for taking into account the soft handoff diversity gain, resulting in an improved power control process for the CDMA network (or system). In one embodiment, power on the punctured bits is increased relative to the full rate traffic channel bits by 10 log N, where N is the number of BTSs involved in a soft handoff with a mobile station. N is capped at 4, i.e., for 5 and 6 way soft handoff, N of 4 is used. During softer handoff, no additional power is accounted for, however, there still exists diversity gain that the present embodiments handle.

The method of the present disclosure includes sending a fictitious or artificial FPC_SUBCHAN_GAIN parameter value to the mobile station, the artificial FPC_SUBCHAN_GAIN parameter representing a value that is not an true value of how much the punctured bit powers have literally been increased by. In other words, if the mobile station goes from one way to two way soft handoff (i.e., adding a link), the method includes increasing the power on the punctured bits by 3 dB, but informing the mobile station via the fictitious or artificial FPC_SUBCHAN_GAIN parameter value that the network has only increased the power by 2 dB. A specific value (or values) of the artificial FPC_SUBCHAN_GAIN parameter (or parameters) can be determined according to requirements of a given network application, for example, through field trials or through more intensive methods of on-line optimization, i.e., fuzzy logic, neural nets, etc.

The use of the artificial FPC_SUBCHAN_GAIN parameter forces the mobile station via a reverse link power control process to power down the base stations immediately from an original power down of P/2 by an additional 1 dB. Accordingly, the additional power down (i.e., the additional 1 dB) accounts for the diversity gain on the channel. The value of 1 dB of diversity gain is for example illustrative purposes only and in reality, the actual diversity gain may be larger than 1 dB. Accordingly, this example is for illustrative purposes only, and not intended to be limiting.

In reality, when new sectors are added to a wireless call via a soft handoff, the new sectors are not generally the same strength power level as received at the mobile station. During soft handoff, each sector is designed to transmit at the same power level, however, due to differing path losses to the mobile station as a result of differences in shadow fading, fast fading, distance and antenna orientation, the received power from different sectors is unlikely to be equal to the received power of the original sectors involved with the call. In connection with the illustrative example above in which the original base station transmits at power P, if the second base station added is about 6 dB smaller in terms of mean received power, and all other sectors contribute a very small fraction of interference to the system, then the powers transmitted by each of these two dominant sectors should be (without accounting for diversity gain) about 0.95 P to obtain the same received Eb/No at the MS. However, the resultant diversity gain could lower the power requirements much further. The diversity gain is somewhat greater if both sectors had about equivalent path loss to the mobile station. In this context, path loss implies shadow fading, distance, and antenna orientation, and NOT fast fading.

According to the present embodiments, informing the mobile station that the power on the punctured bits is 2 dB more than the traffic channel bits, while really transmitting 3 dB more power on the punctured bits, would result in a lowering of the power at each base station from 0.95 P to about 0.75 P (1 dB diversity gain accounted for). By informing the mobile station with an artificial FPC_SUBCHAN_GAIN parameter, the network achieves a prescribed diversity gain compensation very quickly and improves the system performance.

The present method also applies to instances when soft handoff links are dropped. In such a case, when a link is to be dropped, the link is characteristically very weak and probably not providing much diversity gain. Hence, when a link is dropped and the power on the punctured power control bits drops, the consequence of informing the mobile station of the exact value of the power drop would result in the mobile station increasing the power of the forward traffic channel by too large an amount.

Accordingly, the action of misleading the mobile station via the artificial FPC_SUBCHAN_GAIN parameter of the present embodiments provides an improved efficiency in the power control process during soft handoff state changes. According to the present embodiments, the value for the artificial FPC_SUBCHAN_GAIN parameter for use when adding or dropping links need not be the same in each instance, however, it is recommended that the artificial FPC_SUBCHAN_GAIN parameter values be the same due to stability issues. In one embodiment, going from one-way to two-way and from two-way to one-way includes the use of different artificial FPC_SUBCHAN_GAIN values to account for the respective diversity gains. Generally, the add and drop thresholds for soft handoff are different.

While the method of the present disclosure has been discussed with respect to soft handoff, the method of the present embodiments can also be applied to the implementation of softer handoffs as well. Softer handoff is characterized by communication of the MS with more than one sector of a single cell. While the implementation of a softer handoff does not require additional gain on the punctured bits, it does provide considerable diversity gain. Accordingly, the use of an artificial FPC_SUBCHAN_GAIN parameter according to the method of the present disclosure improves system performance. According to one embodiment, the artificial FPC_SUBCHAN_GAIN parameters are implemented with the use of prescribed parameter state flow diagrams, look up tables, or other suitable process.

In one embodiment, the method includes first and second state flow diagrams. The first state flow diagram is specific to the adding of links and the second state flow diagram is specific to the dropping of links. The state flow diagrams each include actual gains on the punctured bits (going from an (m,n) handoff state to an (o,p) handoff state), and a corresponding artificial FPC_SUBCHAN_GAIN parameter to be sent to the mobile station. The state flow diagrams may also include the actual FPC_SUBCHAN_GAIN parameter.

Alternatively, a first state flow diagram may include actual gains on the punctured bits for both adding and dropping of links and the second state flow diagram may include the artificial FPC_SUBCHAN_GAIN parameters for both adding and dropping of links as shown in FIGS. 9 and 10.

The embodiments of the present disclosure advantageously improve a fast forward power control process for a CDMA telecommunications system. The present embodiments further account for diversity gain more quickly than under the prior known method. For example, without the diversity gain compensation provided by the present embodiments, for short duration voice calls, a frame error rate (FER) performance would be too high for some calls, and too low for other calls. For very long duration calls, the diversity gain compensation effects would average out. Note, however, most wireless calls are considered short duration voice calls. In other words, short duration voice calls are typically on the order of 120 seconds. During instances of such short duration voice calls where a FER is not met and is too high, the CDMA network would raise flags (i.e, some form of corrective action is needed), and during instances where the FER is to low, CDMA system capacity is needlessly sacrificed. The present embodiments overcome such disadvantages by an appropriate accounting of diversity gain during the adding and/or dropping of a given link or links, as discussed herein. Use of the artificial FPC_SUBCHAN_GAIN parameter provides a high correlation to account for such diversity gain.

According to one embodiment, the method of fast forward power control includes using at least one fast forward power control look up table. Entries within the look up tables are established as a function of the soft handoff states. When a link is added, the power on the punctured bits of the power control group is increased by a given amount, however, an artificial FPC_SUBCHAN_GAIN parameter value is sent to the mobile station in lieu of the actual FPC_SUBCHAN_GAIN parameter value. The artificial FPC_SUBCHAN_GAIN parameter value is different from the actual FPC_SUBCHAN_GAIN parameter value, whereby the artificial FPC_SUBCHAN_GAIN value takes into account a compensation for diversity gain.

In a similar manner, when links are dropped, the power on the punctured bits is decreased by a given amount, however, an artificial FPC_SUBCHAN_GAIN parameter value is sent to the mobile station in lieu of the actual FPC_SUBCHAN_GAIN parameter value. The artificial FPC_SUBCHAN_GAIN parameter value is different from the actual FPC_SUBCHAN_GAIN parameter value, whereby the artificial FPC_SUBCHAN_GAIN value takes into account a compensation for diversity gain.

According to another embodiment of the present disclosure, with reference again to FIG. 1, a computer program product is provided for facilitating fast forward power control in a CDMA network. The computer program product includes a computer program processable by a computer system 11 (FIG. 1) for causing the computer system to establish an artificial FPC_SUBCHAN_GAIN parameter having a value different from an actual FPC_SUBCHAN_GAIN parameter. The actual FPC_SUBCHAN_GAIN parameter represents an actual amount of power that a punctured bit has been increased or decreased by. The computer program further includes substituting the artificial FPC_SUBCHAN_GAIN parameter in place of the actual FPC_SUBCHAN_GAIN parameter during a fast forward power control. The value of the artificial FPC_SUBCHAN_GAIN parameter is selected in a manner to compensate for a diversity gain occurring as a result of an adding of a link or a dropping of a link between at least one base station and a mobile station. Lastly, the computer program causes the computer system to send the artificial FPC_SUBCHAN_GAIN parameter from the at least one base station transceiver to the mobile station.

Computer system 11 includes any suitable computer or processor for executing processes and performing operations (e.g. communicating information) in response thereto as discussed further herein. Computer system 11 may also include a network server having a suitable operating system.

The computer program product further includes apparatus 13 (FIG. 1) from which the computer program is accessible by the computer system. Exemplary apparatus include any suitable storage device, such as magnetic media (e.g., floppy diskettes), optical media (read/write CD ROMs), or other suitable computer-readable media, etc. Programming of the computer program can be accomplished using programming techniques known in the art, and thus not described in further detail herein.

Computer system 11 is structurally and functionally interrelated with each of its connected computer-readable media (e.g., computer-readable media 13), as described further herein.

For example, floppy diskette 13 stores (e.g. encodes, records, or embodies) functional descriptive material (e.g. including but not limited to computer programs (also referred to as software or applications) and information structures). The functional descriptive material is structurally and functionally interrelated to floppy diskette 13.

Within such functional descriptive material, information structures define structural and functional interrelationships between such information structures and floppy diskette 13 (and other aspects of system 10). Also, within such functional descriptive material, computer programs define structural and functional interrelationships between such computer programs and floppy diskette 13 (and other aspects of system 10). Such interrelationships permit the computer programs' functionality to be realized. Accordingly, such functional descriptive material exhibits a functional interrelationship with the way in which computer 11 executes its processes and performs its operations.

In addition to reading functional descriptive material from floppy diskette 13, computer 11 is capable of reading such functional descriptive material from (or through) a computer network which is another type of computer-readable medium (or apparatus) connected to computer 11.

In one embodiment, the artificial FPC_SUBCHAN_GAIN parameter includes a plurality of different artificial FPC_SUBCHAN_GAIN parameters stored in a state flow diagram or diagrams. The state flow diagram include artificial FPC_SUBCHAN_GAIN parameters particular to the adding of at least one link. The state flow diagram may also include artificial FPC_SUBCHAN_GAIN parameters particular to the dropping of at least one link. Substituting the artificial FPC_SUBCHAN_GAIN parameter in place of the actual FPC_SUBCHAN_GAIN parameter occurs during a soft handoff. Additionally, substituting the artificial FPC_SUBCHAN_GAIN parameter is place of the actual FPC_SUBCHAN_GAIN parameter occurs during a softer handoff.

The computer program is further for causing the computer system to establish a first value for the artificial FPC_SUBCHAN_GAIN parameter for a one-way to a two-way soft handoff link and establish a second value for the artificial FPC_SUBCHAN_GAIN parameter for a two-way to one-way soft-handoff link. In one embodiment, the first value accounts for a first level of diversity gain and the second value accounts for a second level of diversity gain different from the first level of diversity gain.

Accordingly, the present embodiments improve a power control stability of a wireless telecommunications (CDMA) network or system. The present embodiments further improve call performance, especially for short duration calls. Lastly, the present embodiments facilitate an improved forward link performance in the CDMA system.

As described herein, the IS 2000 standard allows only positive numbers for the FPC_SUBCHAN_GAIN parameter. The present embodiments, however, allow for the implementation of positive and negative numbers, i.e., power on the subchannel could be less than power on the rest of the full rate bits. This is in anticipation of future upgrades/evolution of the standard. Accordingly, the present embodiments are suitable for the current standard and for any future changes.

Although only a few exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention as defined in the following claims. In the claims, means-plus-function clauses are intended to cover the structures described herein as performing the recited function and not only structural equivalents, but also equivalent structures.

What is claimed is:

1. A method of fast forward power control in a CDMA network comprising:
    establishing an artificial FPC_SUBCHAN_GAIN parameter having a value different from an actual FPC_SUBCHAN_GAIN parameter, the actual FPC_SUBCHAN_GAIN parameter representative of an actual amount of power by which a punctured bit has been increased or decreased;
    substituting the artificial FPC_SUBCHAN_GAIN parameter in place of the actual FPC_SUBCHAN_GAIN parameter during fast forward power control, the value of the artificial FPC_SUBCHAN_GAIN parameter selected to compensate for a diversity gain occurring as a result of an adding of a link or a dropping of a link between at least one base station transceiver and a mobile station; and
    transmitting the artificial FPC_SUBCHAN_GAIN parameter from the at least one base station transceiver to the mobile station.

2. The method of claim 1, wherein the artificial FPC_SUBCHAN_GAIN parameter includes a plurality of different artificial FPC_SUBCHAN_GAIN parameters.

3. The method of claim 2, wherein the artificial FPC_SUBCHAN_GAIN parameters may be represented as values in a state flow diagram.

4. The method of claim 3, wherein the state flow diagram includes artificial FPC_SUBCHAN_GAIN parameters particular to the adding of at least one link.

5. The method of claim 3, wherein the state flow diagram includes artificial FPC_SUBCHAN_GAIN parameters particular to the dropping of at least one link.

6. The method of claim 1, wherein substituting the artificial FPC_SUBCHAN_GAIN parameter in place of the actual FPC_SUBCHAN_GAIN parameter occurs during a soft handoff.

7. The method of claim 1, wherein substituting the artificial FPC_SUBCHAN_GAIN parameter is place of the actual FPC_SUBCHAN_GAIN parameter occurs during a softer handoff.

8. The method of claim 1, further comprising establishing a first value for the artificial FPC_SUBCHAN_GAIN parameter for a one-way to a two-way soft handoff link and establishing a second value for the artificial FPC_SUBCHAN_GAIN parameter for a two-way to one-way soft-handoff link, the first value accounting for a first level of diversity gain and the second value accounting for a second level of diversity gain different from the first level of diversity gain.

9. A network element for facilitating fast forward power control in a CDMA network comprising:
    means for establishing an artificial FPC_SUBCHAN_GAIN parameter having a value different from an actual FPC_SUBCHAN_GAIN parameter, the actual FPC_SUBCHAN_GAIN parameter representative of an actual amount of power by which a punctured bit has been increased or decreased;
    means for substituting the artificial FPC_SUBCHAN_GAIN parameter in place of the actual FPC_SUBCHAN_GAIN parameter during fast forward power control, the value of the artificial FPC_SUBCHAN_GAIN parameter selected to compensate for a diversity gain occurring as a result of an adding of a link or a dropping of a link between at least one base station transceiver and a mobile station; and
    means for transmitting the artificial FPC_SUBCHAN_GAIN parameter from the at least one base station transceiver to the mobile station.

10. The network element of claim 9, wherein the artificial FPC_SUBCHAN_GAIN parameter includes a plurality of different artificial FPC_SUBCHAN_GAIN parameters.

11. The network element of claim 10, wherein the artificial FPC_SUBCHAN_GAIN parameters may be represented as values in a state flow diagram.

12. The network element of claim 11, wherein the state flow diagram includes artificial FPC_SUBCHAN_GAIN parameters particular to the adding of at least one link.

13. The network element of claim 11, wherein the state flow diagram includes artificial FPC_SUBCHAN_GAIN parameters particular to the dropping of at least one link.

14. The network element of claim 9, wherein substituting the artificial FPC_SUBCHAN_GAIN parameter in place of the actual FPC_SUBCHAN_GAIN parameter occurs during a soft handoff.

15. The network element of claim 9, wherein substituting the artificial FPC_SUBCHAN_GAIN parameter is place of the actual FPC_SUBCHAN_GAIN parameter occurs during a softer handoff.

16. The network element of claim 9, further comprising means for establishing a first value for the artificial FPC_SUBCHAN_GAIN parameter for a one-way to a two-way soft handoff link and for establishing a second value for the artificial FPC_SUBCHAN_GAIN parameter for a two-way to one-way soft-handoff link, the first value accounting for a first level of diversity gain and the second value accounting for a second level of diversity gain different from the first level of diversity gain.

17. A computer program product for facilitating fast forward power control in a CDMA network comprising:
    a computer program processable by a computer system for causing the computer system to:
    establish an artificial FPC_SUBCHAN_GAIN parameter having a value different from an actual FPC_SUBCHAN_GAIN parameter, the actual FPC_SUBCHAN_GAIN parameter representative of an actual amount of power by which a punctured bit has been increased or decreased,
    substitute the artificial FPC_SUBCHAN_GAIN parameter in place of the actual FPC_SUBCHAN_GAIN parameter during fast forward power control, the value of the artificial FPC_SUBCHAN_GAIN parameter selected to compensate for a diversity gain occurring as a result of an adding of a link or a dropping of a link between at least one base station transceiver and a mobile station, and
    transmit the artificial FPC_SUBCHAN_GAIN parameter from the at least one base station transceiver to the mobile station; and apparatus from which the computer program is accessible by the computer system.

18. The computer program product of claim 17, wherein the artificial FPC_SUBCHAN_GAIN parameter includes a plurality of different artificial FPC_SUBCHAN_GAIN parameters.

19. The computer program product of claim 18, wherein the artificial FPC_SUBCHAN_GAIN parameters may be represented as values in a state flow diagram.

20. The computer program product of claim 19, wherein the state flow diagram includes artificial FPC_SUBCHAN_GAIN parameters particular to the adding of at least one link.

21. The computer program product of claim 19, wherein the state flow diagram includes artificial FPC_SUBCHAN_GAIN parameters particular to the dropping of at least one link.

22. The computer program product of claim 17, wherein substituting the artificial FPC_SUBCHAN_GAIN parameter in place of the actual FPC_SUBCHAN_GAIN parameter occurs during a soft handoff.

23. The computer program product of claim 17, wherein substituting the artificial FPC_SUBCHAN_GAIN parameter is place of the actual FPC_SUBCHAN_GAIN parameter occurs during a softer handoff.

24. The computer program product of claim 17, wherein the computer program is further for causing the computer system to:
  establish a first value for the artificial FPC_SUBCHAN_GAIN parameter for a one-way to a two-way soft handoff link and establish a second value for the artificial FPC_SUBCHAN_GAIN parameter for a two-way to one-way soft-handoff link, the first value accounting for a first level of diversity gain and the second value accounting for a second level of diversity gain different from the first level of diversity gain.

25. A method of fast forward power control subchannel gain processing in a CDMA network using punctured power control bits, said method comprising:
  monitoring an occurrence of a soft handoff state change between a mobile station (MS) and at least two base station transceivers (BTSs);
  responsive to the occurrence of the soft handoff state change, determining whether a change is required for a forward power control subchannel gain (FPC_SUBCHAN_GAIN) to the BTSs;
  responsive to a determination that a change is required for the FPC_SUBCHAN_GAIN, determining an actual amount to increase or decrease a power of the punctured power control bits; and
  determining whether to notify the MS of an artificial FPC_SUBCHAN_GAIN amount, the artificial FPC_SUBCHAN_GAIN amount having a value different from the actual FPC_SUBCHAN_GAIN amount.

26. The method of claim 25, further comprising:
  establishing the artificial FPC_SUBCHAN_GAIN amount for providing a desired amount of diversity gain compensation.

27. The method of claim 26, further comprising:
  notifying the MS of the artificial FPC_SUBCHAN_GAIN amount.

28. A network element in a CDMA network including fast forward power control subchannel gain processing using punctured power control bits, said network element comprising:
  a processor for:
    monitoring an occurrence of a soft handoff state change between a mobile station (MS) and at least two base station transceivers (BTSs);
    responsive to the occurrence of the soft handoff state change, determining whether a change is required for a forward power control subchannel gain (FPC_SUBCHAN_GAIN) to the BTSs;
    responsive to a determination that a change is required for the FPC_SUBCHAN_GAIN, determining an actual amount to increase or decrease a power of the punctured power control bits; and
    determining whether to notify the MS of an artificial FPC_SUBCHAN_GAIN amount, the artificial FPC_SUBCHAN_GAIN amount having a value different from the actual FPC_SUBCHAN_GAIN amount.

29. The network element of claim 28, wherein said processor further for:
  establishing the artificial FPC_SUBCHAN_GAIN amount for providing a desired amount of diversity gain compensation.

30. The network element of claim 29, further wherein said processor further for:
  notifying the MS of the artificial FPC_SUBCHAN_GAIN amount.

31. A network element in a CDMA network for facilitating fast forward power control processing comprising:
  a processor for:
    establishing an artificial FPC_SUBCHAN_GAIN parameter having a value different from an actual FPC_SUBCHAN_GAIN parameter, the actual FPC_SUBCHAN_GAIN parameter representative of an actual amount of power by which a punctured bit has been increased or decreased;
    substituting the artificial FPC_SUBCHAN_GAIN parameter in place of the actual FPC_SUBCHAN_GAIN parameter during fast forward power control, the value of the artificial FPC_SUBCHAN_GAIN parameter selected to compensate for a diversity gain occurring as a result of an adding of a link or a dropping of a link between at least one base station transceiver and a mobile station; and
  a transmitter for transmitting the artificial FPC_SUBCHAN_GAIN parameter from the at least one base station transceiver to the mobile station.

* * * * *

UNITED STATES PATENT AND TRADEMARK OFFICE
CERTIFICATE OF CORRECTION

PATENT NO.    : 6,622,023 B2
DATED         : August 16, 2003
INVENTOR(S)   : Chheda

It is certified that error appears in the above-identified patent and that said Letters Patent is hereby corrected as shown below:

<u>Column 8,</u>
Line 10, please delete the word "go" from between the words "network" and "operators".

<u>Column 11,</u>
Line 20, please delete the word "if" from after the word "computes".

Signed and Sealed this

Tenth Day of May, 2005

JON W. DUDAS
*Director of the United States Patent and Trademark Office*